United States Patent [19]

Moretti et al.

[11] Patent Number: 5,264,790
[45] Date of Patent: * Nov. 23, 1993

[54] DEVICE FOR DETECTING RELATIVE SPEED OF INNER AND OUTER RINGS FOR AN ABS BRAKING SYSTEM

[75] Inventors: Roberto Moretti, Cambiano; Angelo Vignotto, Turin, both of Italy

[73] Assignee: SKF Industrie, S.p.A., Airasca, Italy

[*] Notice: The portion of the term of this patent subsequent to Mar. 2, 2010 has been disclaimed.

[21] Appl. No.: 27,172

[22] Filed: Jul. 1, 1991

[30] Foreign Application Priority Data

Apr. 7, 1990 [IT] Italy ................ 67489 A/90

[51] Int. Cl.⁵ .................. G01P 3/487; G01R 33/06
[52] U.S. Cl. .......................... 324/174; 324/207.20; 324/207.22; 324/207.21; 384/448; 188/181 A
[58] Field of Search .......... 324/207.22, 207.20, 324/207.21, 207.25, 235, 174, 175, 252, 251, 262; 384/448; 188/181 A

[56] References Cited

U.S. PATENT DOCUMENTS

| | | | |
|---|---|---|---|
| 3,162,804 | 12/1964 | Parsons | 324/207.2 X |
| 3,636,767 | 1/1972 | Duffy | 324/174 X |
| 4,525,670 | 6/1985 | Miyagawa et al. | 324/174 X |
| 4,810,965 | 3/1989 | Fujiwara et al. | 324/207.21 X |

FOREIGN PATENT DOCUMENTS

| | | | |
|---|---|---|---|
| 63-111416 | 5/1988 | Japan | 324/207.20 |
| 1-09302 | 1/1989 | Japan | 324/207.22 |
| 893986 | 4/1962 | United Kingdom | 324/174 |

Primary Examiner—Gerard R. Strecker
Assistant Examiner—Warren S. Edmonds
Attorney, Agent, or Firm—Eugene E. Renz, Jr.

[57] ABSTRACT

A device for detecting speed in a braking system between two relatively rotatable elements, such as, the inner and outer rings of a roller bearing used to support a vehicle wheel. The device includes a first deflector mounted on one of the bearing rings having a magnetized ring member and a plurality of radially outwardly facing poles separated by non-magnetized spaces and a serrated annular member having a plurality of radially inwardly facing ribs. The device further includes a second deflector integral with a fixed ring of the bearing having at least one magnetic sensor engageable between the two bearing rings and spaced to intersect the magnetic fields to produced a plurality of signals per revolution. The signal produced by the sensor has a frequency proportional to the relative speed of the inner and outer bearing rings.

8 Claims, 3 Drawing Sheets

DEVICE FOR DETECTING RELATIVE SPEED OF INNER AND OUTER RINGS FOR AN ABS BRAKING SYSTEM

FIELD OF THE INVENTION

The present invention relates to improvements in devices capable of detecting rotational speed of two relatively rotatable elements such as the support elements of a vehicle wheel.

BACKGROUND OF THE INVENTION

The need for installation of special control circuits in automotive vehicles is increasing. Typical of the type of control circuits presently in automotive vehicles include so-called anti-lock braking system (ABS) which prevent the locking of the vehicle wheels during braking, ASR Systems, which ensure correct traction of motor vehicles, devices for detecting speeds such as tachometers and devices for measuring the distance travelled such as odometers. At present these detection systems are comprised of basic component such as phonic rings, detecting sensors, on-board computers and hydraulic systems. The phonic ring is usually a serrated ring mounted on the rotating part desired to be monitored and the sensor comprising a passive or active type is mounted on the fixed part of the frame and confronts the serrated zone of the phonic ring at a predetermined distance. Electronic signals emanating from individual sensors are transmitted to the on board computer which in the case of the ABS computes the differences in the speed of wheels of the vehicle.

Passive sensors currently utilized operate by variation in reluctance and require no input. However, sensors of this type must be mounted externally to the bearing and are thus unprotected against possible impacts, contaminating agents and other hazards. This type of sensor is particularly sensitive to metal particles resulting from wear of the brakes near the sensor themselves and to the elevated temperatures developed by disc brakes. They also require appropriate calibration during the mounting phase by the user. It has also been found that the sensors are incapable of detecting rotational speeds down to zero miles per hour and thus cannot be use for tachometric and odometric measurements.

SUMMARY OF THE INVENTION

With the foregoing in mind, it is an object of the present invention to provide a detection device characterized by novel features of construction and arrangement which eliminates the shortcomings of the devices presently in use discussed above. Specifically, the invention relates to a detection device capable of detecting the relative rotational speeds of the support elements of a vehicle wheel which consist of an initial deflector or ring formed integrally with a rotating ring in the bearing and which carries twin magnetized rings with pairs of poles of opposite signs, between which a sensor of the magnetic type carried by a second deflector or support integral with the fixed ring of the bearing is operationally inserted. The magnetic sensor is located between the n polar expansions, the number of which conforms to the pairs of opposing poles of the twin magnetized rings.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
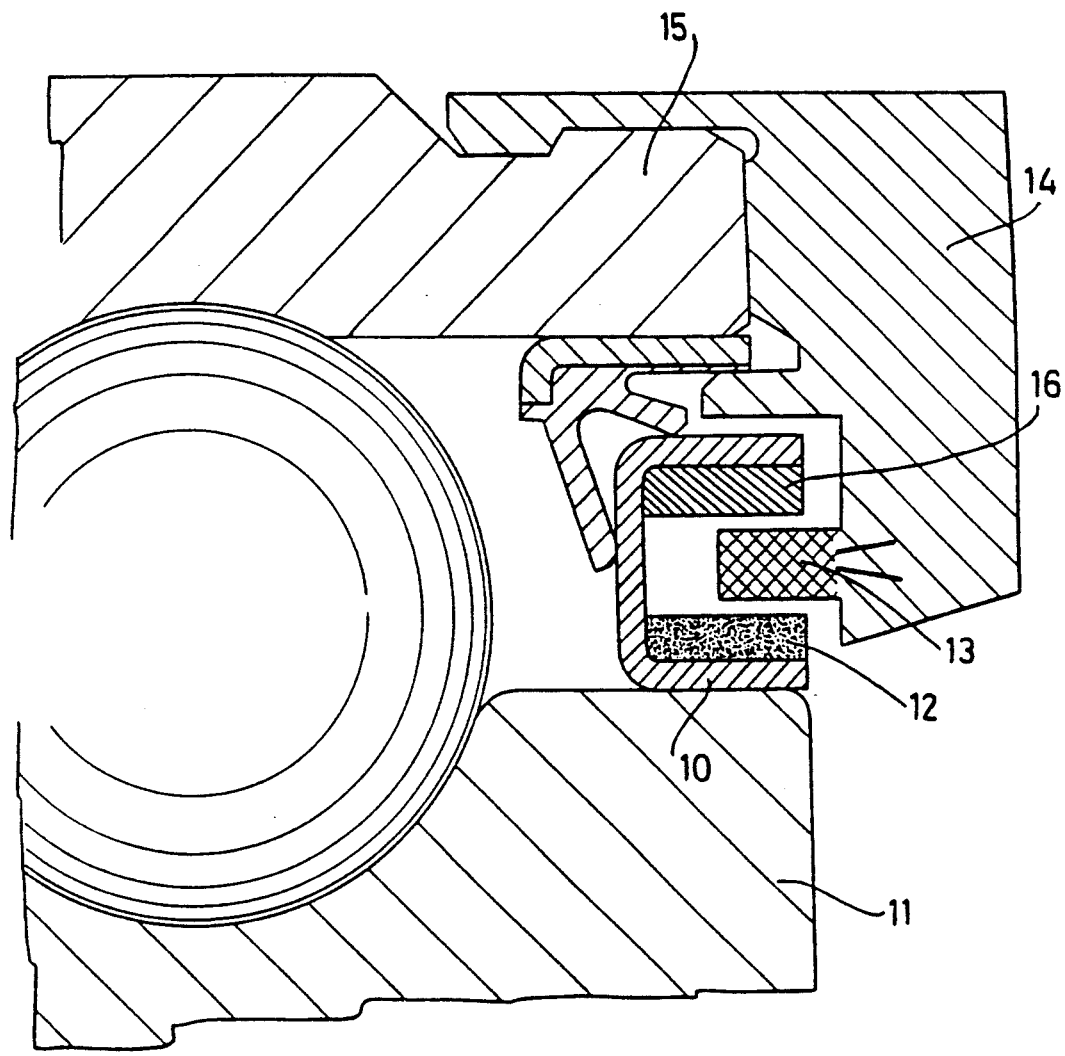
FIG. 1 is a sectional view of a speed detecting system in accordance with the present invention.

Referring now to the drawings and particularly to FIG. 1 thereof, there is shown a bearing assembly generally designated by the reference B for supporting the wheel of the vehicle comprising usual inner and outer relatively rotatable rings 11 and 15 respectively and a plurality of rolling elements, balls in the annular space between the rings.

Figure 2:
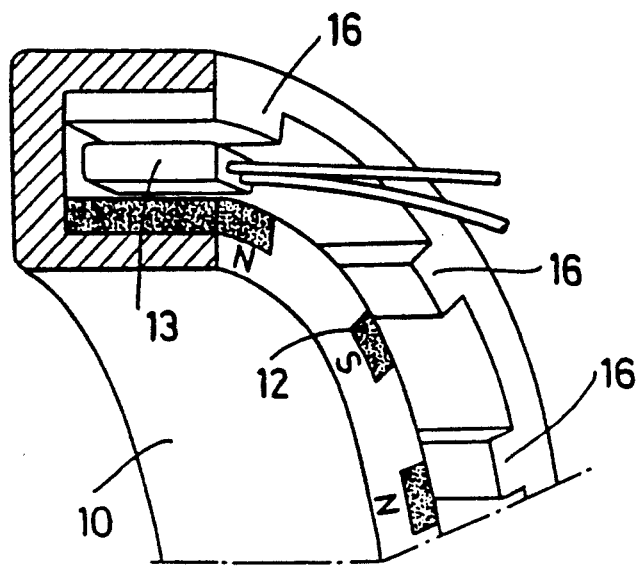
FIGS. 2 and 3 show partial perspective views of the system in two typical applications.
Figure 3:
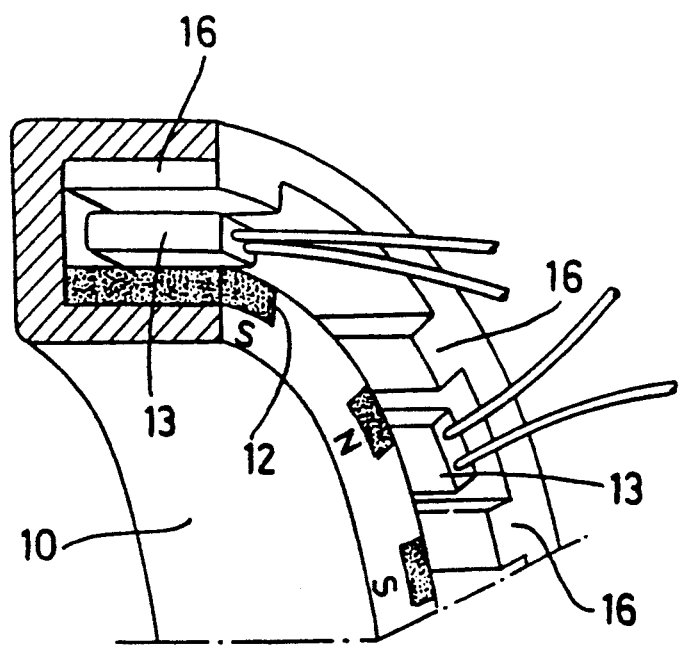

Speed sensing device in accordance with the present invention includes a primary support 10 consisting of an annular U-shaped element mounted on the rotating ring 11 of the bearing assembly. The support 10 has illustrated in FIGS. 2 and 3 carries a magnetized ring 12 on one of its flanges, the inner flange 10 consisting of poles of alternating sign NSN as illustrated in FIG. 2. The magnetized ring 12 may also consist of poles of the same sign and in NNN or SSS as illustrated in FIG. 3. As serrated ring having a plurality of radially inwardly depending serrations 16 confront and overlie the magnetized portions of ring 12 about the circumference of the outer axial leg 10b of the primary support 10. A lubricated seal made of a resilient material is mounted in the outer ring 15 and sealingly engages the support 10 in a manner permitting relative rotation of the inner and outer rings 11 and 15.

The detection system of the present invention further includes a second support mounted on the outer ring 15 carries a magnetic sensor 13 operating by the Hall-effect or of the magnetoresistance type. The sensor as illustrated engages in the annular gap between the magnetized ring 12 and the serrated ring 16.

Magnetic sensor 13 with its integrated control of electronics is supplied by the on-board voltage of the motor vehicle. The signal furnished to the on-board computer is a function n of the changes in the magnetic field to which the element is subjected. The Hall-effect sensor can be of the linear, unipolar, bipolar or bipolar with memory type.

As best illustrated in FIG. 2, sensor 13 is immersed in the magnetic field created by n magnets 12 and is accompanied by metal serrations 16 facing them.

Magnetized ring 12 can be of rubber impregnated with magnetic particles and fixed or vulcanized to a support ring, which can also constitute the closure element of the magnetic flux. Alternatively, ring 12 can be of plastic impregnated with magnetic particles or can consist of sintered materials or even of elementary magnets.

The material in which this is effected can have either isotropic or anisotropic characteristics.

Figure 4:
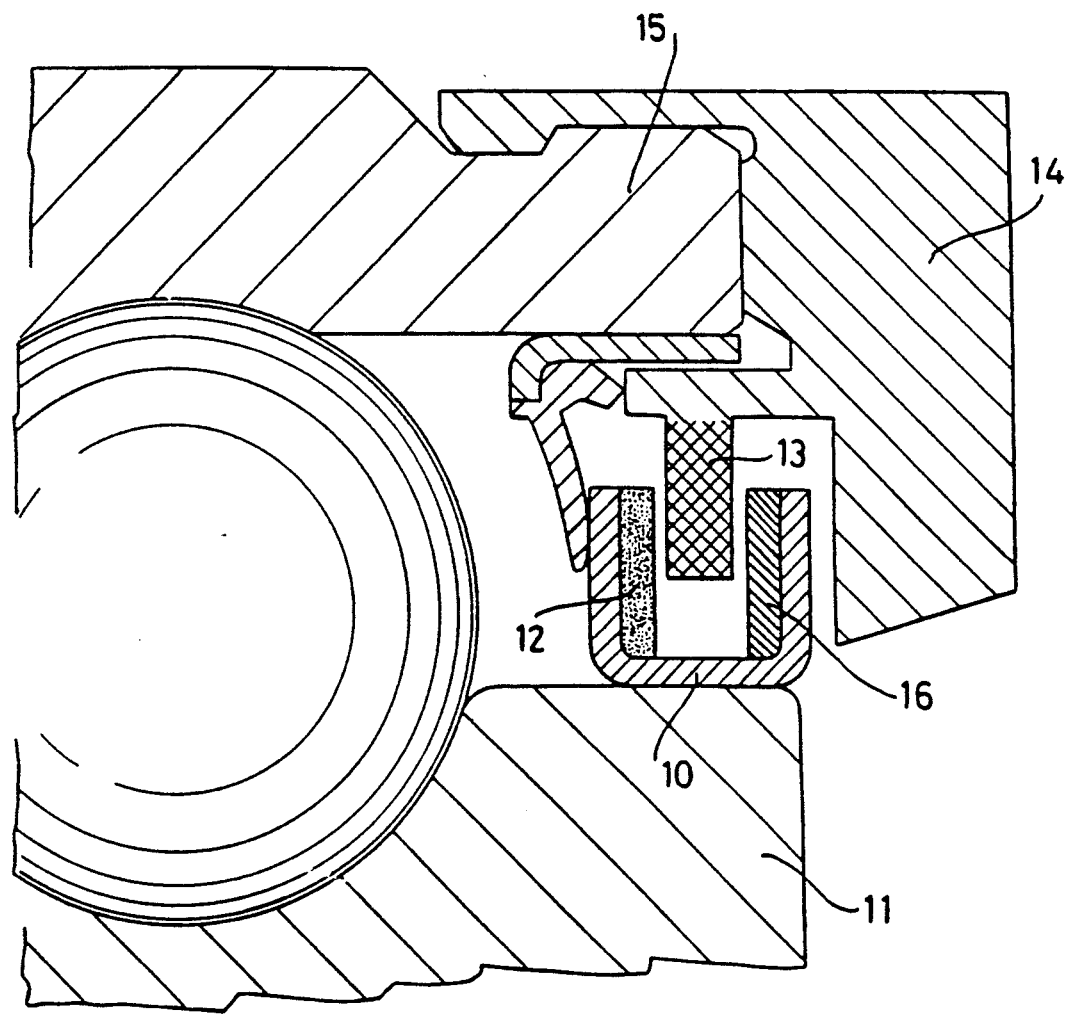
FIG. 4 shows a modification of the system shown in FIG. 1.

The magnetic ring 12-metal serrated ring 16 assembly can be either axially configured as shown in FIG. 1, or radially configured as shown in FIG. 4, without causing any change in the advantages of the invention.

The rotation of deflector 10 with the two rings 12 and 16 integral with it induces variations in the magentic fields in amplitude and sign in Hall effect-magnetic sensor 13.

The signal furnished by the sensor has a frequency proportional to the speed and, assuming the appropriate design of the electronics forming part of the Hall effect sensor 13, is sent to the on-board computer.

The sensor system can also consist of two or more magnetic sensors 13 with their integrated electronics to facilitate dectection of the rotation, using fewer magnetic poles but with each sensor operating at the same frequency.

For this application, the sensors should be spaced by an appropriate angle, as shown schematically in FIG. 3.

The same multisensor system can also be used to detect the direction of rotation of the wheel by providing it with a supplementary output.

What is claimed is:

1. A device for detecting speed in a braking system between inner and outer rings of a roller bearing used to support a vehicle wheel, a first deflector mounted on one of the bearing rings comprising a magnetized ring member mounted on said deflector having a plurality of poles separated by non-magnetized spaces and a serrated ring member having a plurality of radially inwardly directed ribs facing the plurality of poles of the magnetized ring member to define a plurality of radially directed magnetic fields, a second deflector integral with the other bearing ring having at least one magnetic sensor engageable between the two ring members and spaced to intersect each of said plurality of radially directed magnetic fields to produce a plurality of signals per revolution, wherein the signal produced by said sensor has a frequency proportional to the relative speed of the inner and outer bearing rings.

2. A device as claimed in claim 1, wherein the magnetic sensor is of the Hall-effect.

3. A device as claimed in claim 1, characterized in that the sensor is of the magnetoresistance type.

4. A device as claimed in claim 1, characterized in that the poles of the magnetized ring are of alternating sign and alternate with non-magnetized zones.

5. A device as claimed in claim 1, wherein the ring members extend axially defining a radial space therebetween and wherein said magnetic sensor projects axially into said radial space.

6. A device as claimed in claim 1, wherein the ring members extend radially defining an axial space therebetween and wherein said magnetic sensor projects radially into said axial space.

7. A device for detecting speed in a braking system between inner and outer bearing rings used to support a vehicle wheel, comprising a first deflector mounted on one of the bearing rings including a magnetized ring member with poles separated by non-magnetized spaces and a serrated ring member having a plurality of serrations facing the poles of the magnetized ring member, a second deflector integral with the other bearing ring having at least two magnetic sensors operatively inserted between the two rings members and spaced from one another such that only one sensor at a time is radially aligned with a pole and a serration wherein the signal produced by said sensor has a frequency proportional to the relative speed of the inner and outer bearing rings.

8. A device as claimed in claim 7, wherein the magnetic sensors are spaced by multiples or fractions of half the pitch between adjacent poles.

* * * * *

UNITED STATES PATENT AND TRADEMARK OFFICE
CERTIFICATE OF CORRECTION

PATENT NO. : 5,264,790
DATED : November 23, 1993
INVENTOR(S) : Moretti, et al

It is certified that error appears in the above-indentified patent and that said Letters Patent is hereby corrected as shown below: On the title page: Item[21]

change serial number from "27,172" to --723,747--.

Signed and Sealed this

Sixteenth Day of August, 1994

Attest:

BRUCE LEHMAN

*Attesting Officer*    *Commissioner of Patents and Trademarks*